Aug. 21, 1945.    S. K. LEHMAN    2,383,065
FLUID FILTER
Filed July 30, 1942
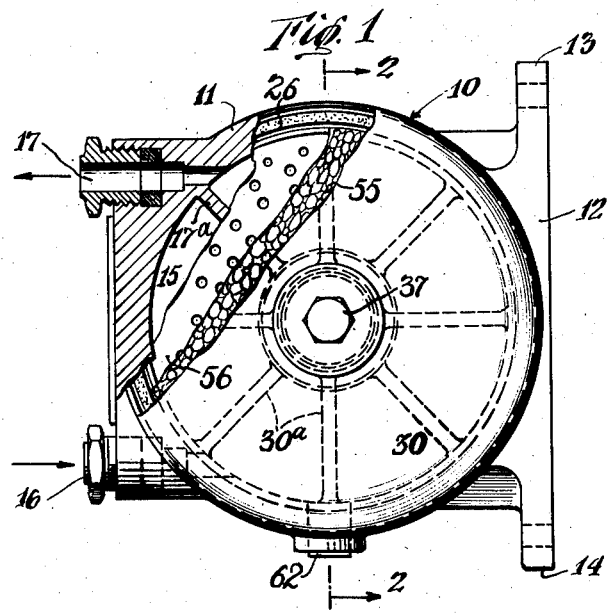
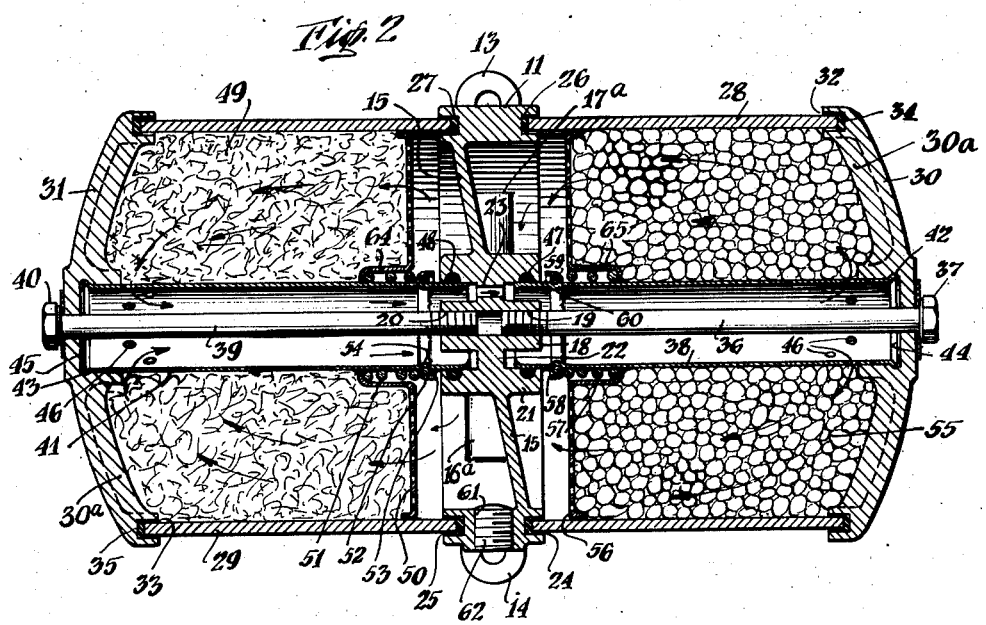
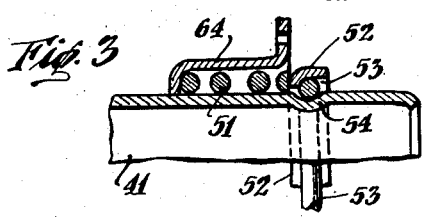
INVENTOR.
Samuel K. Lehman
BY
ATTORNEY Patented Aug. 21, 1945

2,383,065

UNITED STATES PATENT OFFICE 2,383,065

FLUID FILTER

Samuel K. Lehman, Brooklyn, N. Y., assignor to Bendix Aviation Corporation, South Bend, Ind., a corporation of Delaware Application July 30, 1942, Serial No. 452,941

4 Claims. (Cl. 183—48)

This invention relates to filtering devices, and in particular, to fluid filters intended principally to clean and dry air passing therethrough.

It is an object of the present invention to provide a fluid filtering device wherein air or other fluid may be cleaned and dried in sequence, and in which either the cleaning or the drying agent may be independently replaced.

Additional objects of the invention include the provision of a fluid filter having unique mounting of air inlet and outlet means, and easily replaceable compartments for separately confining fluid cleaning and fluid drying agents.

Other objects will become apparent from a study of the attached specification when made in conjunction with the drawing, throughout which like reference numerals refer to like parts.

Fig. 1 is an end elevational view of one embodiment of the present invention with parts broken away.

Fig. 2 is a longitudinal sectional view of the unit shown in Fig. 1, the view being taken along the line 2—2 of Fig. 1.

Fig. 3 is a detail, in section, of certain structure shown in Fig. 2.

Filtering devices, principally those intended for use in any of the air circulating systems of aircraft, such as for deicers or for maintaining ignition harnesses under air pressure, must be mounted within the aircraft for ready access and must be demountable for replacement of filtering agents with a minimum of interference with the construction of the filtering unit.

In the drawing, 10 represents a fluid filter unit having a generally cylindrical base member 11 with an integral mounting flange 12 carrying mounting lugs 13 and 14. Mounting flange 12 ordinarily will be disposed vertically and bolted to the forward end of an aircraft fire wall, not shown. Base member 11 has a radially disposed dividing wall 15, at one end of which there is located an air inlet passageway 16 and on the other side of which is located an air outlet passageway 17. A series of radially extending struts 16a on one side of wall 15, and 17a on the other side of wall 15 are provided as a strengthening means to give the base structure added stiffness. Coaxially of mounting base 11 there is formed an integral sleeve member 18 having sets of internal screw threads 19 and 20.

Sleeve 18 is spaced from the hub portion 21 of mounting base 11 by means of a web member 22 through which is formed a plurality of passageways or apertures 23. Base member 11 has annular grooves 24 and 25 formed on oppositely directed faces, and in these grooves are confined sealing means such as rubber washers 26 and 27, respectively. Cylindrical chambers 28 and 29 have their innermost edges within grooves 24 and 25, respectively. These cylindrical chambers may be formed of any suitable material but are preferably of glass or the transparent plastic sold under the trade-mark, "Lucite." Cylindrical cap or dome members 30 and 31, having integral stiffening ribs 30a, are mounted over the outermost edges of cylindrical compartments 28 and 29 respectively, and caps 30 and 31 carry the respective annular grooves 32 and 33, which contain sealing gaskets 34 and 35, respectively. Cap member 30 is held in fluid tight relation to cylindrical compartment 28 by means of a bolt 36 having a head member 37 and extending within a tubular member 38 into screw-threaded engagement with the threads 19 of collar member 18. Similarly, cap member 31 is held tightly in engagement with compartment wall 29 by means of a bolt 39 having a head member 40, which extends through tubular member 41 into screw-threaded engagement with threads 20 of sleeve member 18.

Tubular members 38 and 41, which may be of sheet metal or other deformable material, have their outermost ends 42 and 43, respectively, spun into tight engagement with the inner surface of bore portions 44 and 45, respectively. A plurality of apertures 46 is formed near the outermost portion of each of the tubular members 38 and 41. The innermost ends of tubular members 38 and 41 fit with a tight but sliding fit within the hub portion 21 of base 11, which portion contains shallow grooves accommodating any suitable sealing means such as rubber washers 47 and 48. An air cleaning agent, such as absorbent cotton 49, is confined within compartment 29 by means of a perforated plate member 50 which is urged to the left, as shown in Fig. 2, by means of a helical spring 51.

The innermost end of spring 51 abuts against an annular washer member 52 (Figs. 2 and 3), which is carried loosely upon tubular member 41, and is retained thereon by means of a split spring retaining ring 53, which fits into a slight annular depression 54 formed on tubular member 41.

Compartment 28 contains a quantity of silica gel 55 or other air-drying agent which is retained within compartment 28 by the perforated baffle or plate 56. A spring member 57 has its outer end abutting against a re-entrant portion of plate 56, and its innermost end abutting against an annular washer 58, which is similar to washer 52. Also a split retaining ring 59 is contained within a depression 60 in an arrangement identical to that above described in connection with tubular member 41.

In operation of the novel filter unit, air enters under pressure through inlet 16 and is directed into the annular space formed at the inner end of compartment 29, whence it is forced through perforated plate member 50 and in contact with the cleaning agent 49, which removes dirt and oil that may be mixed with the entering air. The air leaves the cleaning agent 49 through apertures 46 and flows axially within tubular member 41 through passageways 23 and axially outwardly within tubular member 38 until it reaches apertures 46, formed therein, and is forced under pressure through these apertures into contact with the drying agent 55 within compartment 28. After traversing the drying agent 55, the air, which is now cleaned and dried, passes through perforated plate 56, into the annular space formed inwardly of plate 56 within chamber 28, and thence, is carried through outlet 17 to an ignition harness under pressure, or to any other air utilizing device on an aircraft.

It will be seen that the agents 49 or 55 may be separately renewed at any time by the removal of compartment 28 or 29 without affecting the other compartment or the air inlet and air outlet. If the walls of compartments 28 and 29 are made transparent, as it is intended, the condition of agents 49 and 55 may be readily determined from inspection at the time of the usual engine and accessory overhauls.

In some applications of the invention, air entering inlet 16 may throw oil or other impurity into the annular space formed near the innermost end of compartment 29, and a drain aperture 61, carrying a screw-threaded plug 62, is provided so that the maintenance crew may periodically relieve the filter of any accumulation of oil or other impurity, and thus, avoid the necessity of forcing the impurities through the agents 49 and 55.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

What is claimed is:

1. A device for filtering fluid, comprising a centrally positioned base member of generally cylindrical shape, tangentially located fluid inlet and fluid outlet passageways, an annular dividing wall for isolating said passageways, a centrally disposed sleeve member extending axially of said base member, a plurality of axially extending fluid passageways surrounding said sleeve member and traversing said dividing wall, oppositely directed, annular grooves formed in said base member at the outer edge thereof, cylindrical walls having ends fitted into said grooves and being coaxial with said sleeve member, said walls being suited for confining fluid cleaning and drying agents, cap members engaging said cylindrical walls, tubular members having outer ends fitted into said cap members and inner ends fitted into said base member, said tubular members extending coaxially of said sleeve members, apertures formed in each of said tubular members near the outer ends thereof, rod members extending through said cap members and said tubular members, mating screw-threads formed on said rod members and in said sleeve member for securing said cap members and said cylindrical compartments to said base member, and perforated retaining plate members carried on said tubular members for confining the cleaning and drying agents adapted for use in said compartments.

2. A fluid filter device comprising a generally cylindrical base member having a fluid inlet and a fluid outlet, a dividing wall for separating said fluid inlet from said fluid outlet, a central coaxially extending sleeve member carried on said base member, a perforate web member between said sleeve member and said dividing wall, cylindrical walls projecting coaxially from opposite ends of said base member, each of said cylindrical walls defining a chamber therein cap members for said walls, said walls being suited for holding cleaning and drying agents, one of said walls being in direct communication through the chamber defined thereby with said fluid inlet and the other of said walls being in direct communication with said fluid outlet through the chamber defined by said other wall, a tubular member fitted into each of said cap members and extending through said walls to said base member, said tubular members being in direct fluid communication through said apertured web, apertures formed in said tubular members adjacent said cap members, whereby fluid communication between said inlet, said walls and said outlet is established, and means extending through each of said cap members and separately secured to said sleeve member for retaining each of said walls in assembled relation to said base member independently of each other.

3. A fluid filter comprising a generally cylindrical base member having supporting means integral therewith, a fluid inlet and a fluid outlet formed on said base member, a dividing wall for isolating said inlet from said outlet, a first filtering housing containing a cleaning agent, a second filtering housing containing a drying agent, tubular and axially extending fluid conduits extending through said housings and in communication with each other at their adjacent ends, said conduits being apertured for affording fluid communication through said cleaning and drying agents respectively with said inlet and said outlet, whereby fluid may be continuously circulated through said agents in sequence, and means for separately mounting said filtering housings on said base member at opposite sides of said dividing wall.

4. A fluid filter comprising a base member having supporting means integral therewith, a fluid inlet and a fluid outlet formed on said base member, a first filtering housing containing a cleaning agent, a second filtering housing containing a drying agent, fluid conduits extending through said housings and in communication with each other at their adjacent ends, said conduits being apertured for affording fluid communication through said cleaning and drying agents respectively with said inlet and said outlet, whereby fluid may be continuously circulated through said agents in sequence, and means for mounting said filtering housings on said base member at opposite sides of said base member.

SAMUEL K. LEHMAN.